United States Patent [19]

Noren et al.

[11] 4,098,224

[45] Jul. 4, 1978

[54] GAS COATING APPARATUS

[75] Inventors: Robert C. Noren; Michael H. Spritzer, both of San Diego, Calif.

[73] Assignee: General Atomic Company, San Diego, Calif.

[21] Appl. No.: 749,876

[22] Filed: Dec. 13, 1976

[51] Int. Cl.² ........................................... C23C 11/00
[52] U.S. Cl. .............................. 118/49; 118/DIG. 5
[58] Field of Search ................. 118/48, 49, DIG. 5, 118/49.1

[56] References Cited

U.S. PATENT DOCUMENTS

| | | | |
|---|---|---|---|
| 3,398,718 | 8/1968 | Pilloton | 118/48 |
| 3,566,830 | 3/1971 | Flamm | 118/48 |
| 3,636,923 | 1/1972 | McCreary et al. | 118/DIG. 5 UX |
| 3,800,740 | 4/1974 | Robinson | 118/DIG. 5 X |

*Primary Examiner*—Wm. Carter Reynolds
*Attorney, Agent, or Firm*—Fitch, Even, Tabin & Luedeka

[57] ABSTRACT

Three embodiments of apparatus for gas coating particles suspended in a fluidized bed within a coating chamber are illustrated, each having a base plate with a center opening, an extension nozzle assembly arranged in the opening and mounted on a movable two-piece internally cooled gas probe for supplying reactant gas to the nozzle and an annular unloading passage surrounding the probe and in communication with a side unloading chute. In the three embodiments, different means are provided for raising and lowering the nozzle assembly to permit unloading of coated particles and provide access to the nozzle assembly.

16 Claims, 7 Drawing Figures

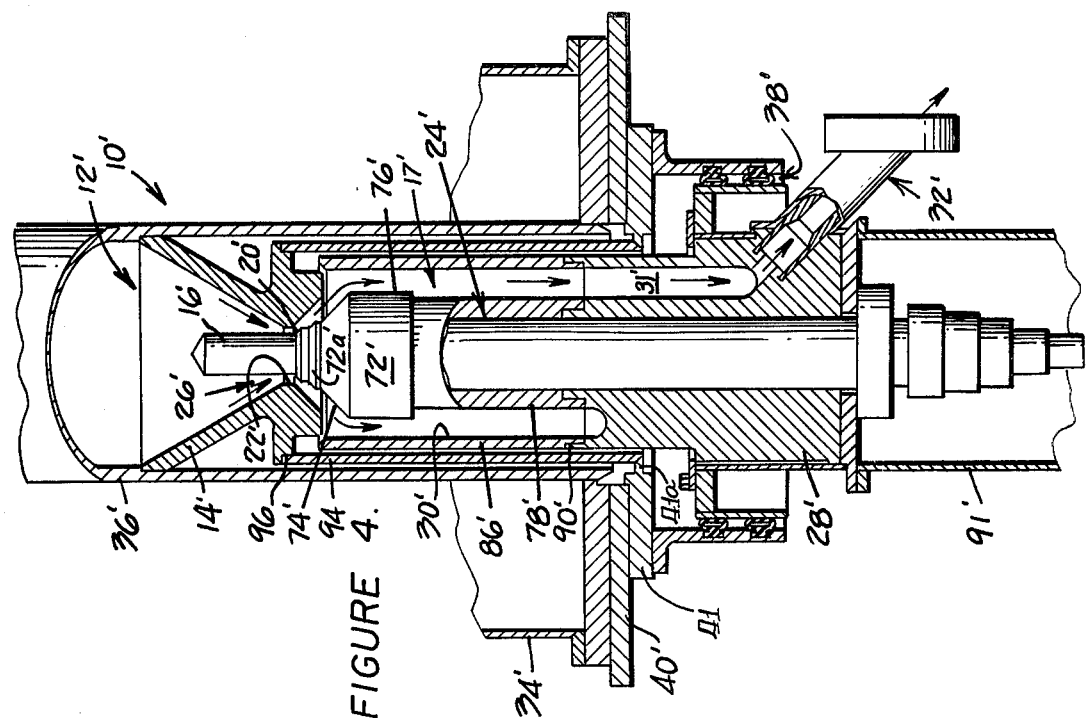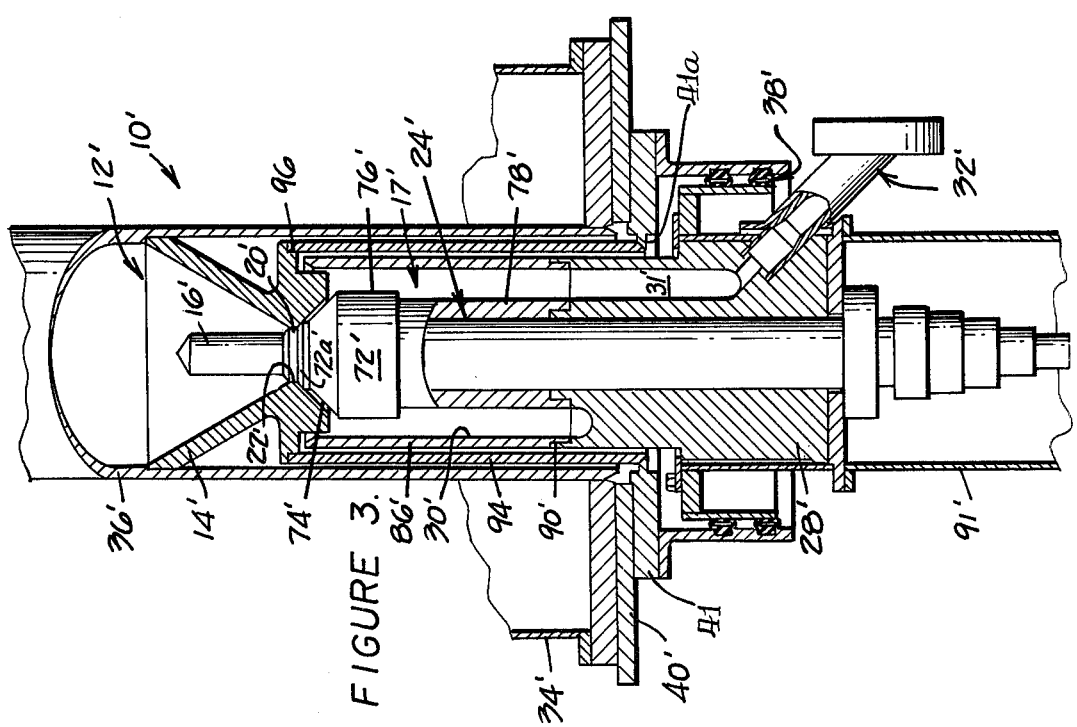

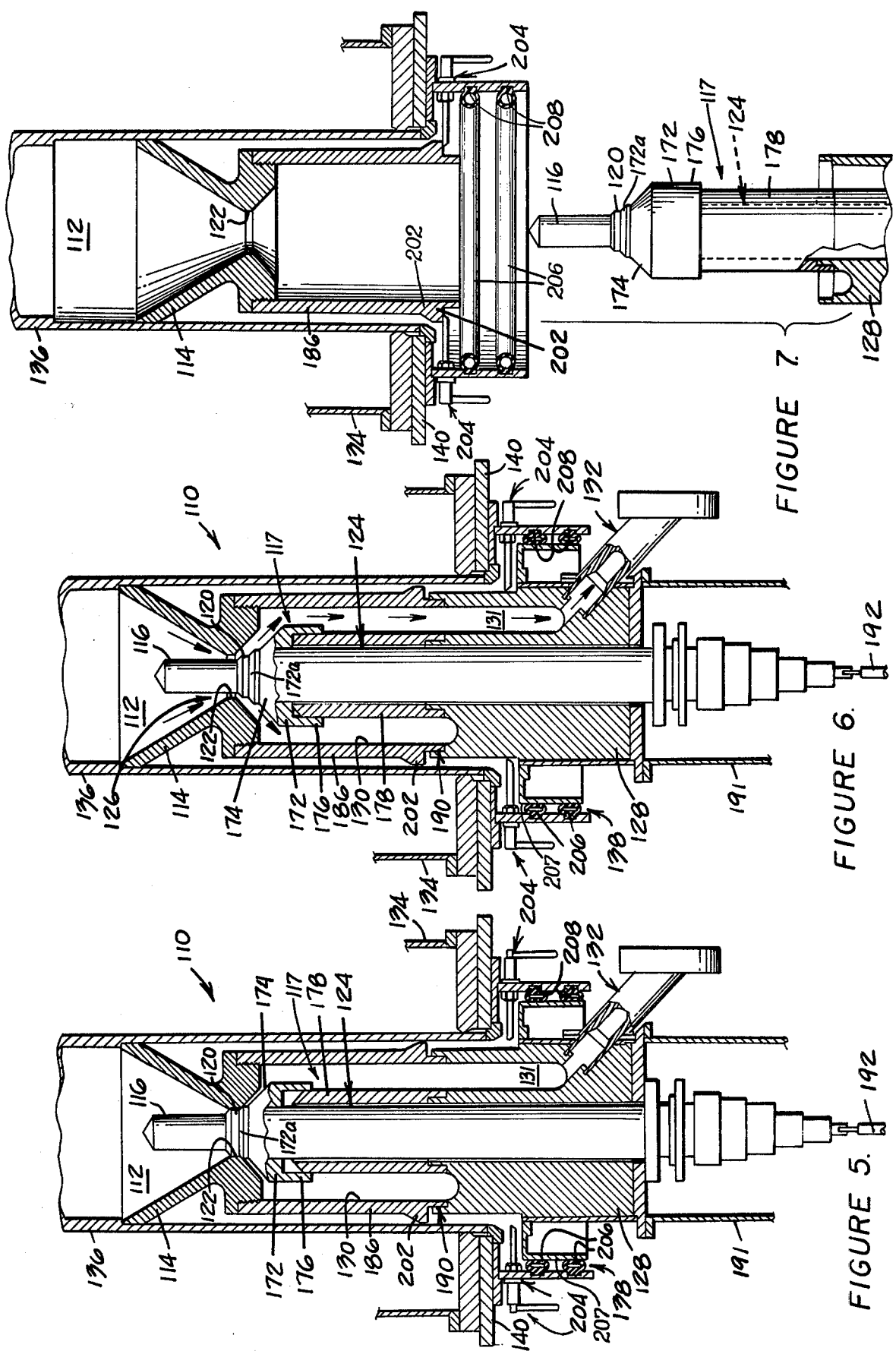

GAS COATING APPARATUS

BACKGROUND OF THE INVENTION

The present invention relates to apparatus for the gas coating of particles suspended in a fluidized bed. More particularly, the invention relates to such apparatus for the gas coating of particles such as nuclear fuel particles under high temperature conditions while facilitating gravity unloading of coated particles therefrom.

It is well known in the prior art to employ coatings of pyrolytic carbon or metallic carbides, for example to provide protection for nuclear fuel particles used in nuclear reactors. Such particles are normally small, for example on the order to 500 microns, and may be formed from a suitable fissile material such as uranium, plutonium, thorium, or a suitable compound thereof.

Within a nuclear reactor, the nuclear fuel particles are exposed to conditions of high temperature and severe irradiation over long periods of operation. In order to assure continued effectiveness within such an environment, the fuel particles are commonly coated with an impermeable material which retains gaseous and metallic fission products within the confines of the individual particles. Such coatings may be developed through high temperature decomposition of a suitable hydrocarbon such as acetylene, propylene, propane or methane for example.

Examples of fuel particles provided with such coatings are disclosed and set forth for example in U.S. Pat. No. 3,325,363, issued June 13, 1967 to Goeddel et al.; U.S. Pat. No. 3,298,921, issued Jan. 17, 1968 to Bokros et al.; U.S. Pat. No. 3,361,638, issued Jan. 2, 1968 to Bokros et al.; and U.S. Pat. No. 3,639,452, issued Mar. 14, 1972 to Chin et al.

A preferred method for coating nuclear fuel particles with a suitable material comprises the deposition of the coating material through the high temperature decomposition for example of gaseous hydrocarbons such as those listed above. Preferably, the coating operation is efficiently carried out with the particles being suspended in the form of a fluidized bed within a high temperature coating chamber. Levitation or suspension of the particles within the fluidized bed is commonly achieved through the controlled introduction of a hydrocarbon gas, an inert carrier gas or a combination thereof beneath the particle bed. Most commonly, an inert carrier gas such as argon, helium, nitrogen or hydrogen is employed for this purpose.

Within a preferred configuration for such a coating chamber, the coating chamber base is preferably in the form of an inverted conical member which is porous or otherwise provided with means for introducing the levitating gas beneath the particle bed.

Within the coating chamber, the small nuclear fuel particles tend to be suspended within the fluid bed under generally isothermal conditions. The reactant gas is introduced into the high temperature environment of the coating chamber and decomposed to provide the coating material for the particles. The various conditions for carrying out such coating operations are well known, including temperature ranges within the coating chamber as well as the rates of pressures under which both the reactant and levitating gases are introduced into the chamber and the duration of the coating operation.

Such high temperature gas coating operations, employing fluidized beds of particles and carried out in accordance with the prior art, have encountered numerous problems. Of particular concern within the present invention are the problems of efficiency for the coating operation and design simplicity for the coating apparatus.

In connection with efficiency of operation, a substantial delay has been noted in the past since the particles are coated in batches within the coating chamber and must be removed from the high temperature chamber before a subsequent coating operation may be commenced with a new batch of particles. Two common techniques for unloading the loading chamber include vacuum removal of the coated particles through a vacuum probe and the forming of an unloading port in a lower portion of the chamber to permit gravity flow of the coated particles from the chamber.

Vacuum removal of the particles is generally undesirable since the particles must first be substantially cooled in order to prevent their being damaged during unloading. Gravity unloading of the particles has been a problem in the past because of difficulties in designing the coating chamber to provide an unloading port and also because of a tendency for carbonaceous deposits to interfere with gravity flow of particles from the chamber.

At the same time, the construction of such coating chambers has been relatively complex in the past because of the need for supplying both levitating and reactant gases to the coating chamber while preventing decomposition of the reactant gas before it is intermixed with the particles. The construction of the coating apparatus has been further complicated by the need for providing rapid and efficient unloading means as described above.

Accordingly, there has been found to remain a substantial need for improved apparatus for the gas coating of particles suspended in a fluidized bed permitting efficient removal of the coated particles from the apparatus.

SUMMARY OF THE INVENTION

It is therefore an object of the present invention to provide improved apparatus for the gas coating of particles suspended in the fluidized bed while overcoming one or more problems of the type referred to above.

It is a more specific object of the invention to provide such apparatus which facilitates the coating operation by permitting rapid removal of coated particles from a high temperature coating chamber.

It is another specific object of the invention to provide such apparatus through the provision of a center unloading opening formed by a movable elongated nozzle mounted upon a gas probe including a coolant circulating shell around passage means for supplying reactant gas to the nozzle.

It is an even more specific object of the invention to provide different means for raising and lowering the elongated nozzle for forming the unloading opening and also for providing ready access to the nozzle itself.

Additional objects and advantages of the invention are made apparent in the following description having reference to the accompanying drawings.

BRIEF DESCRIPTION OF THE DRAWINGS

FIGS. 3 and 4 illustrate another embodiment of the present invention, FIG. 3 illustrating the coating apparatus in a closed configuration suitable for coating, while FIG. 4 represents the same coating apparatus configured for the unloading of coated particles from the chamber.

FIGS. 5-7 illustrate yet another embodiment of the present invention, FIG. 5 illustrating the coating apparatus in a closed configuration suitable for coating, FIG. 6 representing the apparatus in a configuration for unloading coated particles from the chamber, and FIG. 7 illustrating the manner in which various internal portions of the apparatus may be lowered from the high temperature coating chamber to facilitate maintenance operations.

DESCRIPTION OF THE PREFERRED EMBODIMENTS

Figures 1, 2:
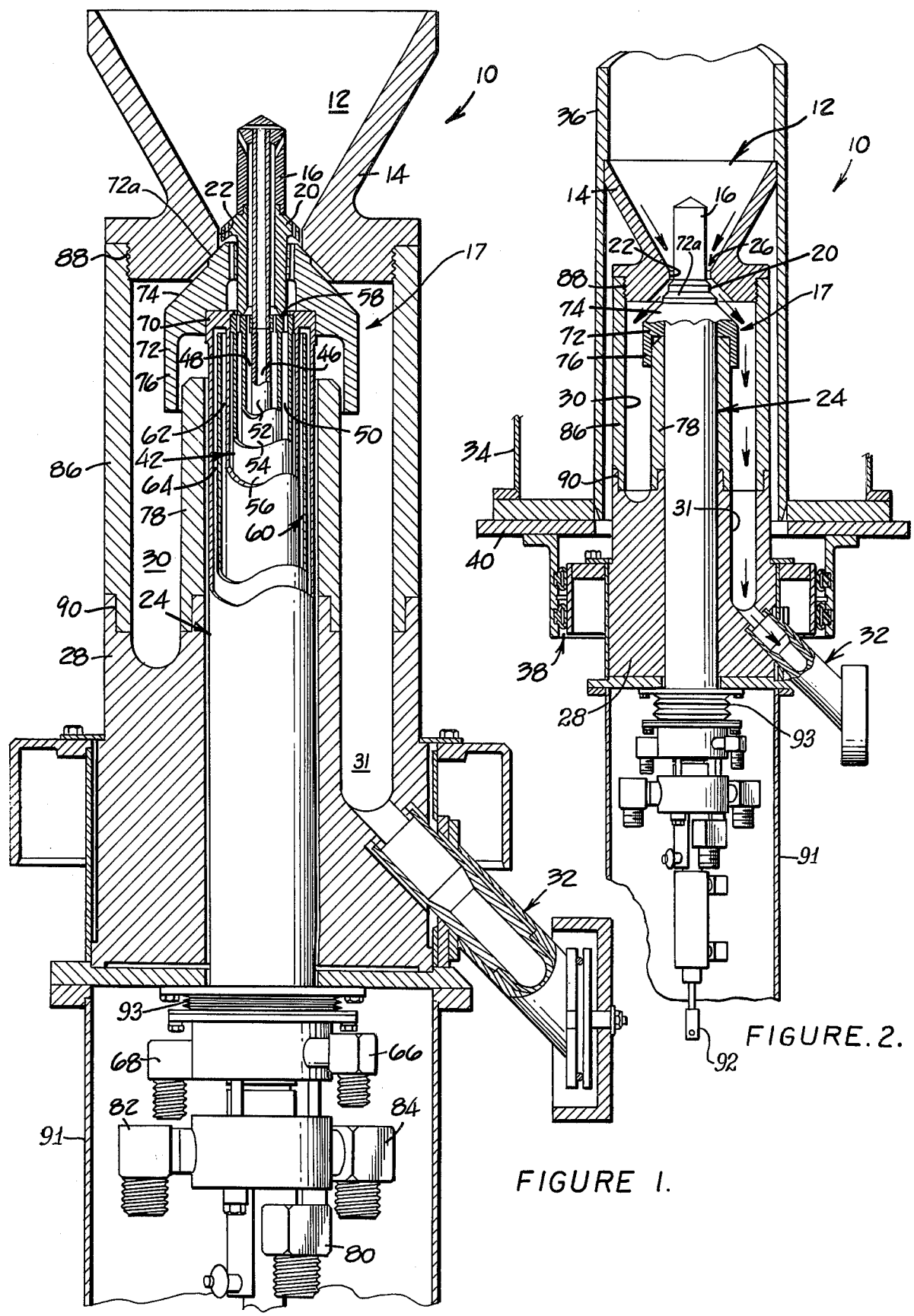
FIG. 1 is an enlarged view, with parts shown in section, of a portion of a gas coating apparatus embodying the present invention.
FIG. 2 is another view of the gas coating apparatus of FIG. 1 with its components positioned for unloading particles from the chamber.

Generally, the present invention relates to apparatus for high temperature gas coating of particles suspended in a fluidized bed. The coating apparatus is indicated at 10 in FIG. 1 and includes a coating chamber 12 having a base plate 14. An elongated reactant gas nozzle 16 extends upwardly from a center portion of the base plate for introducing reactant gas into the coating chamber. The base plate 14 is formed as an inverted conical member and means are provided for introducing levitating gas into the coating chamber in order to form a fluidized bed of particles therein. For example, the base plate 14 may be porous or perforated for communicating levitating gas into the coating chamber in order to form the fluidized bed. However, it is preferable to form the base plate 14 as a solid cone and to introduce the levitating gas through openings formed at the base of the nozzle. In this manner, levitating gases may be supplied to the coating chamber through the same probe described below for directing reactant gas to the nozzle.

The present invention is specifically directed toward three embodiments illustrated respectively in FIGS. 1, 2, FIGS. 3, 4 and FIGS. 5-7 for facilitating the unloading of coated particles from the chamber. Many components of the coating apparatus in the embodiments are similar. Accordingly, the coating apparatus of FIGS. 1 and 2 is described first below. Those components in the coating apparatus of FIGS. 3 and 4 which correspond with similar components in the embodiment of FIGS. 1 and 2 are not described further but are indicated by similar primed numerals. Similar components in the apparatus of FIGS. 5-7 are indicated by similar numerals preceded by an initial numeral "1".

In each embodiment, referring for example to FIGS. 1 and 2, the elongated nozzle 16 forms part of a gas probe assembly 17 and is mounted upon an enlarged base 20 which mates with an opening 22 formed at the apex of the inverted conical base plate 14. The nozzle 16 and nozzle base 20 are mounted upon an elongated gas probe 24 which is also part of the gas probe assembly 17. The gas probe assembly 17 is movable relative to the base plate 14 in order to form an annular opening 26 for unloading coated particles from the coating chamber 12.

A cylindrical housing element 28 forms an annular unloading passage around the probe 24 for receiving coated particles from the annular opening 26 and conveying them to a side unloading chute 32. The side unloading chute may be employed for transferring the hot coated fuel particles to a suitable means, for example, one or more cooled storage hoppers (not shown) which may also be of selected geometry to maintain the stored particles in a critically safe condition.

The high temperature condition within the coating chamber 12 is established by arranging the coating apparatus 10 within a high temperature furnace as partially represented by the furnace shell indicated at 34. The coating chamber 12 is enclosed within a cylindrical coating chamber liner 36 (see FIG. 2) which also extends downwardly throughout the furnace to enclose the gas probe and the housing 28.

In each embodiment, referring again to FIGS. 1 and 2 for example, a seal arrangement 38 is formed between a lower portion of the housing element 28 and a base structure 40 of the furnace. The seal arrangements for the various embodiments are slightly different as described below in order to accommodate relative movement between different components.

Within the coating chamber, the base plate 14 has an included angle within the range of approximately 30° to approximately 140°. The preferred range for the included angle of the conical base plate 14 is from approximately 45° to approximately 90°. In all of the figures, the base plate 14 is illustrated with an included angle of 60°.

The elongated nozzle 16 extends upwardly from the apex of the base plate 14, preferably to a height of at least approximately one quarter of the diameter of the coating chamber 12. This feature of the coating chamber is covered within a copending patent application, Ser. No. 735,186, filed on Oct. 26, 1976, by Langley et al. and entitled FLUIDIZED BED, GAS COATING METHOD AND APPARATUS. Further in connection with the nozzle 16, it is preferably of a type having multiple gas passages for evenly introducing a reactant gas, with or without a diluting carrier gas, into the coating chamber.

Construction of the elongated gas probe 24 and its interconnection with the nozzle 16 and the nozzle base 20 may be most clearly seen in FIG. 1. The gas probe 24 is formed with a separable, two-piece construction including a central portion 42 forming a plurality of gas passages for introducing a plurality of gases to the nozzle base 20 and nozzle 16. Preferably, the central probe portion 42 is formed with three concentric gas passages 46, 48 and 50 which are separated from each other by means of elongated tubes 52, 54 and 56. The upper ends of the tubes are joined to an adapter 58 including openings for communicating the three concentric gas passages 46, 48 and 50 with the nozzle base 20 and nozzle 16. As was discussed above, the probe 24 may also supply levitating gas to the coating chamber.

An outer portion 60 of the probe is formed as a shell for circulating coolant along the length of the probe to protect gases being communicated to the nozzle through the passages 46, 48 and 50 from surrounding high temperatures. For this purpose, the outer probe portion 60 is formed with a coolant supply passage 62 and a coolant return passage 64. Thus, coolant may be introduced into the supply passage 62 for example through inlet means indicated at 66 with coolant being removed from the return passage 64 through a suitable coolant outlet means 68. Here again, the upper end of the outer probe portion 60 is closed by an annular adapter 70 which permits fluid communication of coolant between the supply and return passages 62 and 64. Thus, access is provided during construction to those surfaces of the outer probe portion including weld seams for containing the coolant liquid. Accordingly, undesirable mixing of the coolant liquid with gases being supplied to the nozzle may be completely avoided. The adapters 58 and 70 for the inner and outer probe portions are adapted to fit together upon assembly.

A hood 72, forming part of the gas probe assembly 17, is mounted upon the upper end of the probe 24 and is penetrated by the nozzle base 20 to permit gas communication between the probe and the nozzle. In addition, the hood 72 is formed with a downwardly and outwardly extending conical surface 74 for directing coated particles from the annular opening 26 toward the annular passage 30 during unloading. With the gas probe assembly 17 in the position shown in FIG. 1, a stepped annular surface 72a on the hood engages the base plate 14 to close the opening 22. The hood 72 also has an annular flange 76 which overlaps an annular portion 78 of the housing 28. This feature facilitates vertical movement of the nozzle while preventing hot coated particles from coming into contact with the gas probe 24.

To complete the description of the probe 24, it is noted that separate inlet means 80, 82 and 84 are provided in communication with the respective gas passages 46, 48 and 50 for communicating various gas components to the nozzle base 20 and nozzle 16.

The various portions of the coating apparatus, such as the base plate 14, nozzle 16, hood 72, housing 28 and side unloading chute are preferably formed from a suitable ceramic material for withstanding high temperatures encountered within such coating apparatus.

To describe the embodiment of FIGS. 1 and 2 in greater detail, it may be best seen in FIG. 1 that a peripheral sleeve portion 86 of the housing 28 is in threaded engagement with the base plate 14 as is indicated at 88. The housing 28 and sleeve portion 86 are formed as two axially separable parts which fit together at a joint indicated at 90.

A probe support skirt 91 extends downwardly from the housing 28 and forms a generally protected region to facilitate the interconnection of gas conduits with the probe 24. Gas leakage between the housing 28 and movable probe 24 is prevented by means of a flexible metal bellows seal which is indicated at 93 in FIGS. 1 and 2 in different conditions of expansion.

In operation, the embodiment of FIGS. 1 and 2 is arranged as illustrated in FIG. 1 for carrying out coating operations within the chamber 12. In order to unload coated particles from the chamber 12, a draw bar means 92 at the lower end of the elongated probe 24 may be employed to shift the entire probe 24 downwardly along with the hood 72, the nozzle base 20 and the nozzle 16 in order to form the annular unloading opening 26. Axial movement between the probe 24 and the housing 28 is accommodated by the overlapping configuration of the hood 72.

With the gas probe 24 and the nozzle 16 lowered as illustrated in FIG. 2, coated particles may flow from the chamber 12 into the annular passage 30 and through the lower portion 31 thereof and out of the side unloading chute 32.

After the coated particles are completely removed from the chamber 12, the gas probe 24 may be again raised by the draw bar 92 in order to regain the configuration of FIG. 1 for a subsequent coating operation.

As indicated above, many components of the embodiment of FIGS. 3 and 4 correspond to the preceding description for the embodiment of FIGS. 1 and 2. The primary difference in the embodiment of FIGS. 3 and 4 resides in the manner in which the gas probe is lowered in order to form the annular unloading opening 26'. Referring particularly to FIGS. 3 and 4, it may be seen that the peripheral annular portion 86' of the housing 28' is movable relative to the base 14'. An additional cylindrical liner 94 is threaded to the base plate 14' as indicated at 96 and extends downwardly toward the base structure 40' of the furnace. During unloading, the cylindrical liner 94 and the conical base plate 14' are supported in the position illustrated in FIGS. 3 and 4 by annular pins 41a formed in a plate 41 which is secured to the base structure 40'. The pins 41a are retracted when the base plate 14' is removed from the furnace.

The design of FIGS. 3 and 4 thus facilitates access to the nozzle 16' without the need for otherwise dismantling the coating apparatus. For example, the housing 28' may be separated from the base plate 14' and lowered beneath the furnace base structure 40' whereupon the nozzle 16' becomes readily accessible for replacement or repair.

Within the embodiment of FIGS. 3 and 4, the seal assembly 38' is adapted to accommodate axial movement between the housing 28' and the furnace base structure 40'. Thus, in order to lower the nozzle 16' nozzle base 20' and hood 72' for forming the annular unloading opening 26', the entire housing 28' is lowered along with the probe 24' by means of the probe support skirt 91' which may be raised and lowered in generally the same manner as described above for the draw bar 92 of FIGS. 1 and 2.

In the embodiment of FIGS. 3 and 4, the hood 72' may be affixed to the annular portion 78' of the housing 28'. However, the hood 72' may also be arranged in overlapping movable relation to the annular portion 78' of the housing 28' in the same manner as described above for the embodiment of FIGS. 1 and 2.

The embodiment of FIGS. 5–7 combines advantageous features of the embodiments of FIGS. 1–2 and FIGS. 3–4. In particular, the embodiment of FIGS. 5–7 employs a similar drawbar 192 as was discussed above in connection with the embodiment of FIGS. 1 and 2 for lowering the probe 124, hood 172, nozzle base 120 and nozzle 116 in order to form the opening 126 for unloading coated particles from the chamber 112. Accordingly, the annular flange 176 for the hood 172 movably overlaps the annular housing portion 178 to accommodate relative movement between the components listed above and the housing 128 including the annular portion 178. The manner in which the coating apparatus 110 is positioned for unloading may be best seen by a comparison of FIGS. 5 and 6.

At the same time, the embodiment of FIGS. 5–7 employs a movable probe support skirt 191, in a similar manner as described above for the embodiment of FIGS. 3 and 4, in order to lower the nozzle 116 and related internal components of the coating apparatus out of the furnace and thereby readily facilitate maintenance operations upon those components. At the same time, the embodiment of FIGS. 5–7 differs somewhat from the embodiment of FIGS. 3–4, as will be discussed in greater detail below, in order to even further facilitate such maintenance operations. In particular, the embodiment of FIGS. 5-7 is designed so that a minimum of material or component mass is removed from the furnace during such maintenance operations. This provides an important advantage in that substantially less cooling is required before the maintenance operations may be performed. In addition, as will be made apparent from the following description, the retaining of certain components within the furnace even further improves access to the nozzle and other components of the coating apparatus which may commonly require maintenance.

Referring now particularly to FIGS. 5 and 6, it may be seen that construction of the probe 124 and the components supported thereon, including the hood 172, nozzle base 120 and nozzle 116 are of similar construction and interact similarly with the housing 128 as was described above in connection with the embodiment of FIGS. 1 and 2. Accordingly, in operation of FIGS. 5 and 6, the drawbar 192 may be operated to lower the above noted components relative to the housing 128 in order to form the unloading passage 126 (see FIG. 6). The drawbar 192 may also be operated in reverse to raise those components and close the above noted opening in order to permit coating operations to be carried out within the chamber 112.

A number of modifications within the embodiment of FIGS. 5-7 are contemplated to permit the probe 124, hood 172, nozzle base 120 and nozzle 116 to be lowered completely out of the coating chamber 112 and the furnace together with only a portion of the surrounding housing. For this purpose, the joint 190 serves as a slip joint between the housing 128 and the peripheral annular portion 186 which extends upwardly to support the base plate 114. The peripheral housing portion 186 is also formed with an annular flange 202 at its lower end. Adjustable retaining pins 204 may also be shifted from a normally retracted position illustrated in FIG. 5 into an extended position illustrated in FIG. 7 where the pins engage the flange 202 in order to support the annular housing portion 186 within the furnace.

Within the embodiment of FIGS. 5-7, it is contemplated that the housing portion 128 and the probe 124 together with those components mounted upon the probe may be lowered in combination by movement of the probe support skirt 191 in a manner also described above for the embodiment of FIGS. 3 and 4.

The seal assembly 138 is also adapted to facilitate such operation. In particular, the seal assembly 138 includes a pair of inflatable seal rings 206 which are positioned and retained by annular channels 208. The inflatable seal rings 206 are inflated to enter into sealing engagement with an annular surface portion 207 of the housing 128, as is best illustrated in FIGS. 5 and 6. When the seals 206 are deflated, they remain in engagement with the channels 208 while the housing 128 including the surface portion 207, along with the components 178, 172, 120 and 116, may be lowered out of the furnace, as illustrated in FIG. 7, for maintenance.

Otherwise, the embodiment of FIGS. 5-7 provides generally the same advantageous features of operation described above for the embodiments of FIGS. 1-2 and 3-4. In particular, the embodiment of FIGS. 5-7 includes the same annular unloading passage 130 which cooperates with the side unloading chute 132 when coated material is unloaded from the chamber 112 through the opening 126.

Numerous modifications and variations are believed apparent within the three embodiments of coating apparatus as described above. Accordingly, the scope of the present invention is defined only by the following appended claims.

What is claimed is:

1. Apparatus for coating particles with a substance contained in a reactant gas, the particles being suspended in a fluidized bed within a coating chamber, comprising
    a base plate having a center opening for gravity unloading of coated particles from the coating chamber,
    a gas probe assembly including a reactant gas nozzle extending upwardly into said coating chamber through the center opening in said base plate, said gas probe assembly having means for closing said opening,
    said gas probe assembly further including an elongated gas probe secured thereto and including gas passage means for communicating reactant gas to said nozzle and a coolant circulating shell means surrounding said passage means, said probe being movable relative to said base plate in order to form an annular unloading opening between said base plate and said closing means on said gas probe assembly therefor.
    housing means forming an annular passage about a portion of said probe for communication with said annular unloading opening, and
    a side unloading chute in communication with a lower portion of said annular passage.

2. The particle coating apparatus of claim 1 wherein said gas passage means in said gas probe comprises a plurality of passages for communicating a plurality of gas streams to said nozzle.

3. The particle coating apparatus of claim 2 wherein said plurality of passages are formed by concentric tubes, said coolant circulating shell means including coolant supply and return passages also formed by concentric tubes.

4. The particle coating apparatus of claim 1 further comprising a hood secured to said gas probe said hood having a downwardly and outwardly extending conical surface forming said closing means and an annular flange therebelow overlapping an annular portion of said housing means forming said annular passage.

5. The particle coating apparatus of claim 4 wherein a peripheral portion of said housing means forming said annular passage extends upwardly to support said coating chamber base plate.

6. The particle coating apparatus of claim 5 wherein said gas probe comprises a central portion forming said gas passage means and a concentric portion forming said coolant circulating shell means with enclosed coolant supply and coolant return passages.

7. The particle coating apparatus of claim 1 wherein said gas probe comprises a central portion forming said gas passage means and a concentric portion forming said coolant circulating shell means with enclosed coolant supply and coolant return passages.

8. The particle coating apparatus of claim 7 wherein said gas passage means in said gas probe comprises a plurality of passages for communicating a plurality of gas streams to said nozzle.

9. The particle coating apparatus of claim 1 wherein said gas probe, and nozzle are movable together relative to said coating chamber base plate for forming said annular unloading opening.

10. The particle coating apparatus of claim 9 wherein said gas probe is movable relative to said housing means forming said annular passage.

11. The particle coating apparatus of claim 10 further comprising a hood secured to said gas probe, said hood having a downwardly and outwardly extending conical surface forming aside closing means and an annular flange therebelow overlapping an annular portion of said means forming said annular passage.

12. The particle coating apparatus of claim 9 further comprising a hood secured to said gas probe, said hood having a downwardly and outwardly extending conical surface forming aside closing means and an annular flange therebelow overlapping an annular portion of said means forming said annular passage.

13. The particle coating apparatus of claim 12 wherein said probe, hood, and nozzle are movable relative to said housing means for forming said annular unloading opening, said probe, hood, and nozzle also being movable relative to said housing means in order to provide access for maintenance.

14. The particle coating apparatus of claim 13 wherein said housing means include a separable peripheral annular portion secured to said base plate, and further comprising means for selectively retaining said peripheral annular portion of said housing means during movement of the remainder of said housing means together with said probe, hood, and nozzle.

15. The particle coating apparatus of claim 1 adapted for the coating of nuclear fuel particles, the coating chamber being a reactor portion of a high temperature furnace.

16. The particle coating apparatus of claim 1 further comprising a cylindrical skirt extending downwardly from said housing means for forming an enclosed region to facilitate interconnection of gas and coolant conduits with said gas probe.

* * * * *

UNITED STATES PATENT AND TRADEMARK OFFICE
CERTIFICATE OF CORRECTION

PATENT NO. : 4,098,224
DATED : July 4, 1978
INVENTOR(S) : Robert C. Noren and Michael H. Spritzer It is certified that error appears in the above-identified patent and that said Letters Patent are hereby corrected as shown below:

Col. 8, Line 26, "therefor." should be deleted and a --,(comma)-- should be added.

Col. 8, Line 42, after "probe" insert --,(comma)--.

Col. 8, Line 66, after "probe" delete --,(comma)--.

Col. 9, Line 7, "aside" should be --said--.

Col. 9, Line 13, "aside" should be --said--.

Signed and Sealed this

Sixteenth Day of October 1979

[SEAL]

Attest:

RUTH C. MASON
Attesting Officer

LUTRELLE F. PARKER
Acting Commissioner of Patents and Trademarks